United States Patent [19]

Albert

[11] Patent Number: 5,059,037
[45] Date of Patent: Oct. 22, 1991

[54] ANTI-FRICTION BEARING FOR LINEAR MOVEMENTS

[75] Inventor: Ernst Albert, Sand, Fed. Rep. of Germany

[73] Assignee: Deutsche Star GmbH, Schweinfurt, Fed. Rep. of Germany

[21] Appl. No.: 580,193

[22] Filed: Sep. 10, 1990

[30] Foreign Application Priority Data

Sep. 20, 1989 [DE] Fed. Rep. of Germany ....... 3931397

[51] Int. Cl.$^5$ ............................................. F16C 31/06
[52] U.S. Cl. .................................................... 384/45
[58] Field of Search ............................ 384/45, 44, 43; 464/168

[56] References Cited

U.S. PATENT DOCUMENTS

| 4,496,197 | 1/1985 | Kwon . |
| 5,011,300 | 4/1991 | Teramachi ............................ 384/45 |

FOREIGN PATENT DOCUMENTS

| 0128871 | 11/1988 | European Pat. Off. . |
| 3128628 | 3/1982 | Fed. Rep. of Germany . |
| 3138996 | 11/1982 | Fed. Rep. of Germany . |
| 3527307 | 4/1986 | Fed. Rep. of Germany . |
| 3134313 | 8/1986 | Fed. Rep. of Germany . |
| 3419401 | 1/1989 | Fed. Rep. of Germany . |
| 2604111 | 3/1988 | France . |

OTHER PUBLICATIONS

Dovetail Slides and Wedge Clamps for Machines and Fixtures (Supplement 56), Handbook of Fastening and Joining of Metal Parts, Laugner, V. H., 1956, p. 542.

Primary Examiner—Lenard A. Footland
Attorney, Agent, or Firm—Brumbaugh, Graves, Donohue & Raymond

[57] ABSTRACT

An anti-friction bearing for linear movements comprising a bearing body (10) which is guided movable on a rail (12) in a longitudinal direction thereof. The bearing body has legs (18a, b) accommodating at least one part of the rail (12) between them and a web (20) connecting these legs (18a, b) in one piece. At least one rolling body cycle (A-D) allocated to each of the legs (18a, b) has one load-transmitting rolling body row (A1-D1) in engagement with one load-receiving running path (B13, D13) of the respective leg (18a, b) and with one running path (A12-D12) at one side face of the rail (12) said side face being adjacent to said leg (18a, b). The load-transmitting rolling body rows (A1-D1) are preloadable between the respective allocated paths (B13, D13; A1-2-D12) and this preload is adjustable by preloading means (30). The preloading means (30) are disposed in the range of the web (20) with a direction of effect substantially normal to the longitudinal direction of the rail (12) and substantially parallel to a connecting plane (VE1, VE2) of the two load-transmitting rolling body rows (A1-D1) lying at either side of the rail (12), and which are designed to upset the web (20) in this direction of effect.

15 Claims, 3 Drawing Sheets

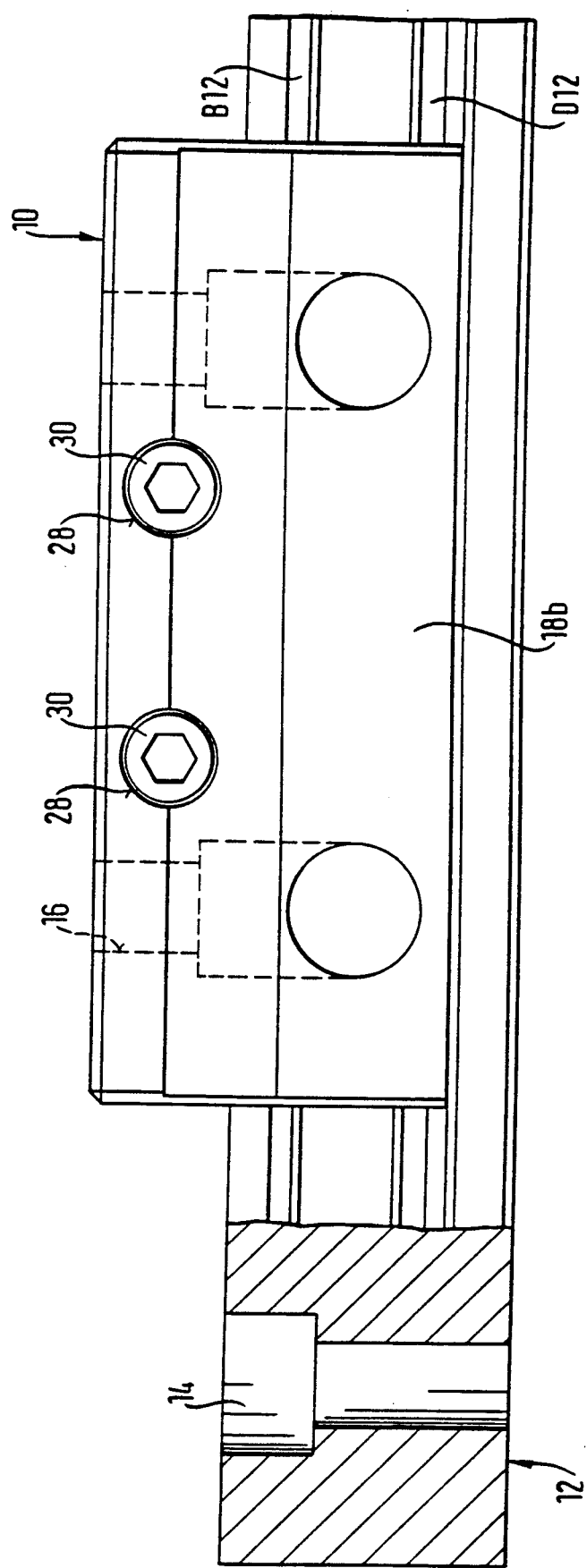

ANTI-FRICTION BEARING FOR LINEAR MOVEMENTS

BACKGROUND OF THE INVENTION

The invention relates to an anti-friction bearing for linear movements comprising a bearing body which is guided movable on a rail in a longitudinal direction thereof, the bearing body having legs accommodating at least one part of the rail between them and a web connecting these legs integrally together, at least one rolling body cycle being allocated to each of the legs and each of the rolling body cycles having one load-transmitting rolling body row in engagement with one load-receiving running path of the respective leg and with one running path at one side face of the rail said side face being adjacent to said leg, the load-transmitting rolling body rows being preloadable between the respective allocated running paths and this preload being adjustable by preloading means.

PRIOR ART

Such an anti-friction bearing is known from DE-PS 34 19 401, where the preload of the load-transmitting rolling body rows is effected by a bending strain of the web around a neutral axis which is parallel to the longitudinal direction of the rail by means of bolts which are effective in terms of compression and tension between the web and a connecting piece connected to the web. The adjustment of the preload can, in this case, only be effected when the anti-friction bearing is connected to the connecting part. Special boreholes for the bolts have to be provided in the connecting part. The assessibility of these boreholes for the adjustment of the preload might be difficult, depending on the case of application.

An anti-friction bearing for linear movement is known from DE-OS 31 28 628, in which the one-piece bearing body in one of the legs which receives the rolling body cycles is provided with a slit running parallel to the longitudinal direction of the rail and being disposed next to the load transmitting paths and in which a cap screw for the adjustment of the preload projects into which is screwed in from the outside of the bearing body. By tightening the cap screw the preload or the rolling bodies can be adjusted. In this case it is disadvantageous that the manufacturing expenditure for the bearing body is therefore high and that it is either attenuated in the lead-in area of the bearing force or has to be enlarged to avoid an attenuation.

From US-PS 4,496,197 an anti-friction bearing is known which is split in two parts in the longitudinal direction of the rail. In order to connect both halves with one another and to obtain a preload of the anti-friction bearing, the two parts of the bearing body are tightened together with the help of screws by using transition pieces which can for example be tube sections. In the case of this anti-friction bearing for linear movement it is disadvantageous that, for different preload values, transition pieces of different lengths have to be used. The consequence is that for one and the same bearing type a number of transition pieces have to be kept ready, in addition to that, the assembly of this linear anti-friction bearing is very burdensome as a multitude of prefabricated parts have to be assembled.

Finally a two-piece anti-friction bearing for linear movements is known from DE-OS 35 27 307. In this anti-friction bearing the two legs receiving the rolling body cycles are connected to one another by a top plate which extends over the rail. The preload adjustment is effected by pressing with adjustment screw bolts on a side of the anti-friction bearing which is parallel to the rail center plane, so that the top plate is elastically deformed and therefore a preload is generated. Here, too, the preload can only be adjusted after the anti-friction bearing is assembled to the connecting part. Furthermore, a particular development of the connecting part is necessary in the case of this anti-friction bearing as well as in the case known from DE-PS 34 19 401. Finally, even the assembly of this anti-friction bearing is problematic as it likewise consists of several parts.

OBJECT OF THE INVENTION

The invention is based on the problem of creating an anti-friction bearing of the type mentioned at the outset, which has a structure being simple and suitable for operation with, an exact and easy preload adjustment possible after assembly of the bearing body and the rail as well as before attachment of the connecting part.

SUMMARY OF THE INVENTION

The aforementioned problem is solved in that the preloading means are disposed in the range of the web with a direction of effect substantially normal to the longitudinal direction of the rail and substantially parallel to a connecting plane of two load-transmitting rolling body rows lying at either side of the rail, and which are designed to upset the web in this direction of effect.

The solution has the advantage that, in the case of simply structured anti-friction bearing with a one-piece bearing body, the preload can already be adjusted while said anti-friction bearing is assembled. In addition to this, for the same anti-friction bearing type no further parts are needed to obtain different preload values and a particular development of the connecting part is not necessary.

To have in the case of a small upsetting power an upset available which is as big as possible and thus to vary the preload within wide boundaries, it is suggested that the preloading means at the web act on points of application whose distance in the direction of effect preferably corresponds to the distance of the load-transmitting roll body rows.

To obtain a shape of the bearing body which is as simple and small as possible, it is furthermore suggested that the preloading means are accomodated within the web where they can work for the stiffening of the web, too.

The preloading means can be formed by different elements. They can, for example, surround the bearing body like a pair of tongs. Preferably the preloading means comprise at least one tension bolt which is accomodated in a borehole within the web. In this case a first point of application of the tension bolt can be formed by a tension bolt head supported by a shoulder of the borehole and a second point of application is formed by a screw-joint of the tension bolt with a thread section of the borehole. In this case the tension bolt can be a screw which can be obtained everywhere.

To make a preload over the entire length of the load-transmitting rolling body rows possible, it is furthermore suggested that the preloading means are spread along the longitudinal extension of the bearing body in the longitudinal direction of the rail. In this case the preloading means can be designed within the longitudinal extension of the load-transmitting rolling body rows for the imparting of varying preload. It is particularly advantageous when in the mid-range of the load-transmitting rolling body rows a higher preload is provided than in the end ranges. Through this, the running-in of the rolling bodies in the load-transmitting rolling body rows is particularly easily practicable.

Both rollers and balls can be used as rolling bodies or roll bodies but the assembly is particularly simple when the rolling body cycles are formed by balls. In this case it can be advantageous when the load-receiving running paths are formed by tracks or raceways which result in a better osculation or bevelling and thus facilitate the reception of heavier loads.

An anti-friction bearing for linear movement according to the invention can be developed in that each leg is allocated to at least and preferably to two rolling body cycles with a corresponding number of load-transmitting rolling body rows, the connecting planes of each of two load-transmitting rolling body rows of both legs being substantially parallel to one another. It is also possible that more than two rolling body cycles are provided As the upset of the web effects an almost uniform approach of load-transmitting rolling body rows in relation to one another, their preload can be varied almost uniformly.

In order to obtain the adjustment of the preload with smaller upsetting forces, it is furthermore suggested that at least one mid-range of the web is constructed elastically-upsetably-soft by recesses. There is the possibility, additionally or on its own, that the bearing body consists of an elastically-upsetable-soft material, especially plastics or aluminium. Furthermore, there is the possibility that the bearing body consists of compound material, a harder material being chosen for its legs accommodating the rolling body cycles than for the web.

It can be envisaged in particular that the load-receiving running paths of the bearing body are designed at running plates which consists of a harder material in comparison to the material of the bearing body, especially of steel, and which are possibly attached for a swing or sway movement in relation to the respective leg. Because the running plates are capable of a swing movement, an optimal power transmission is obtained.

To be able to fix the preloaded anti-friction bearing according to the invention easily to a connecting part, it is furthermore suggested that on the side of the web which is remote from the legs a fixing surface is provided for the fixing of a connecting part and that for the fixing of the connecting part fixing means are provided at this fixing surface which allow a play of the fixing, which corresponds to the region of upset deformations to be expected of the web.

BRIEF DESCRIPTION OF THE DRAWINGS

Further advantageous developments of the invention and an example of embodiment are explained hereinafter with reference to the drawings.

FIG. 3 is a part-sectioned side view of the anti-friction bearing shown in FIG. 1.

DETAILED DESCRIPTION OF THE PREFERRED EMBODIMENTS

Figure 1:
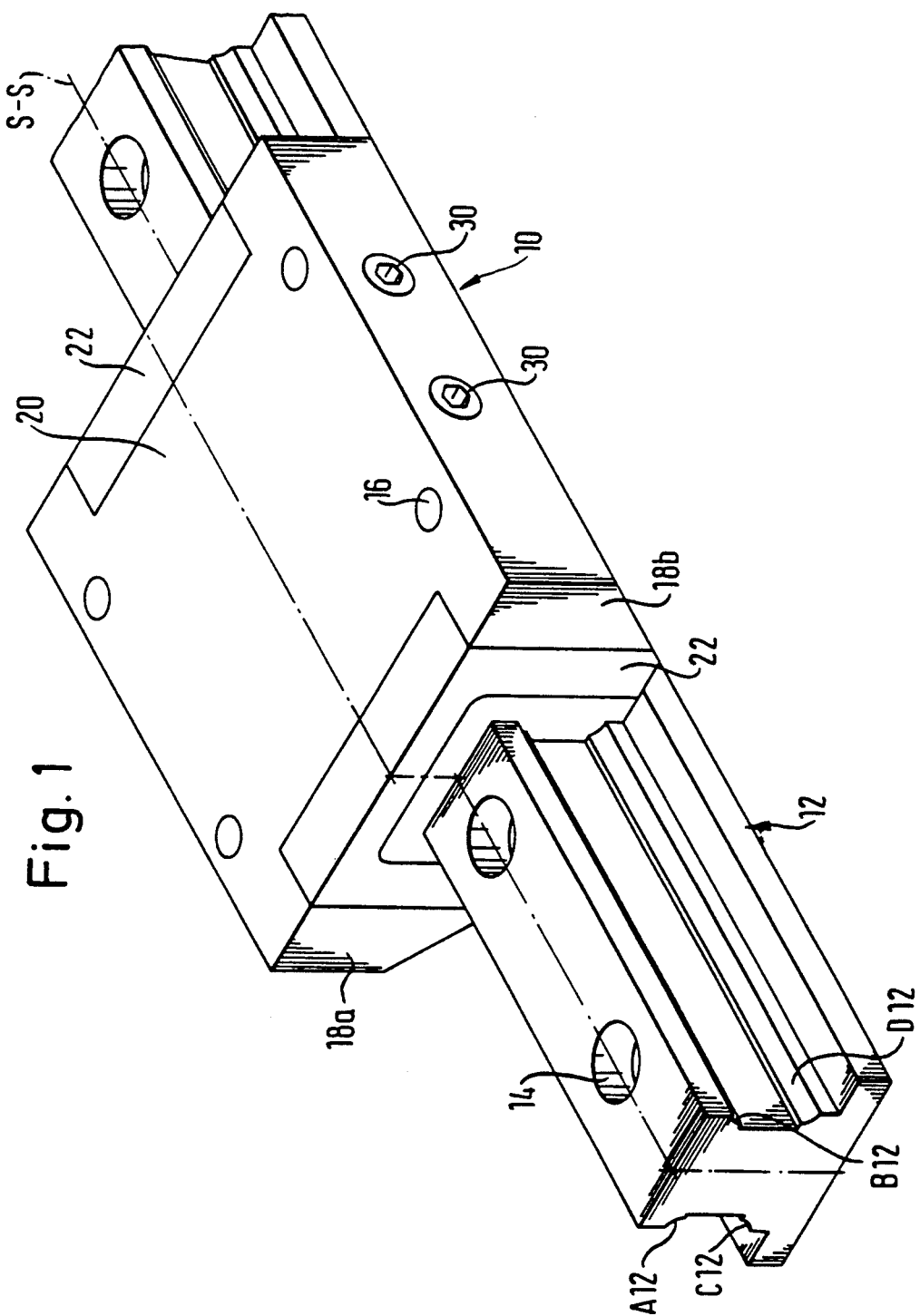
FIG. 1 is a perspective representation of a rail and a bearing body of an anti-friction bearing according to the invention, which is movable along the rail.
Figure 2:
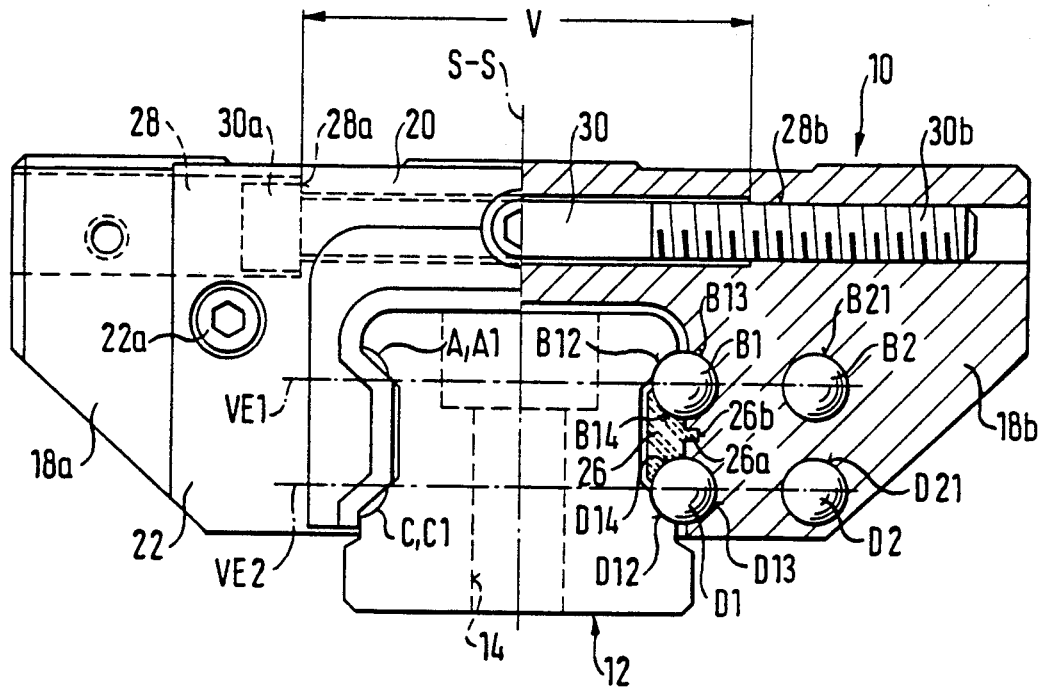
FIG. 2 is a part-sectioned front view of the anti-friction bearing shown in FIG. 1.

In FIG. 1 to 3 a bearing body 10 of an anti-friction bearing is shown which is guided movable on a rail 12 in a longitudinal direction thereof said rail 12 being preferably made of steel. The rail 12 is bolted to a base by means of bolts fitted in boreholes 14 arranged in the center of the rail 12. The fixing of the bearing body 10 to a connecting part which is not shown, for instance a machine tool slide, is effected by bolt-joints with through-boreholes 16 which are situated in the outer region of the bearing body 10 in relation to the plane of symmetry S-S. Depending on the width of the bearing body 10 such through-boreholes 16 can also be disposed in the plane of symmetry S-S. To make an assembly with the connecting part possible, after the preload of the anti-friction bearing has been effected, the diameter of the boreholes 16 is larger than the diameter of the bolts used for fixing. Hereby alignment errors between the through-boreholes 16 of the bearing body 10 and the corresponding boreholes of the connecting part, which arise from the preload, can be compensated.

It is also possible that instead of the through-boreholes 16 threaded screw holes, which are not further shown, are provided in the bearing body 10. In this case, adequate play must be provided in corresponding boreholes of the connecting part in order to compensate for the alignment errors.

Figure 4:
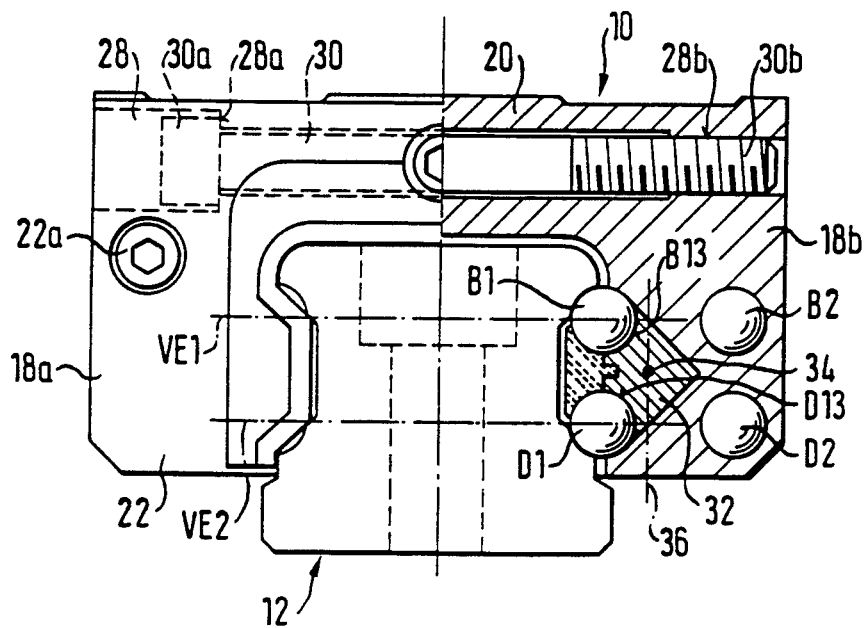
FIG. 4 shows a out-way front view of a further embodiment of the anti-friction bearing according to the invention.

As can be seen from FIGS. 2 and 4, the bearing body 10 has two legs 18a, b which each accomodate two ball cycles or guides A, B, C, D, each of them forming a rolling body cycle or guide and one web 20 connecting these legs 18a, b integrally (see FIG. 1). The legs 18a, b accomodating the four ball cycles A-D are connected with the web 20 in such a manner that the bearing body 10 surrounds the rail 12 in a U-shaped manner. The four ball cycles A-D each consists of one load-transmitting ball row A1, B1, C1, D1 running in the longitudinal direction of the rail 12, which confront four tracks A12, B12, C12, D12 integrated in the rail 12, and of one recirculating ball row B2, D2 which is formed in return channels B12, D12 within the bearing body 10 The load-transmitting ball rows A1 and B1 aswell as C1 and D1 are each situated in one common connecting plane VE1, VE2. (In the FIGS. 2 and 4 only the ball cycles B and D are shown with the respective ball rows B1, D1 and B2, D2. The ball cycles A, C and their load-transmitting ball rows A1, C1 are merely indicated with the corresponding reference number).

The load-transmitting ball rows A1-D1 and the recirculating ball rows B2, D2 are connected to one another by arcuate ball rows which are not further illustrated. Through these endless circulating type ball cycles A-D, resulting in this case, the longitudinal movement of parts movable against one another is made possible, as for example a tool slide in relation to its machine tool bed. The arcuate ball rows are situated in end plates 22 which are fixed in the longitudinal direction of the rail 12 to the respective front-side ends of the bearing body 10 by means of screws 22a.

The load-transmitting ball rows A1-D1 are on the one hand formed by tracks or load receiving running paths B13, D13, integrated in the bearing body 10 and on the other hand by retaining webs 26 likewise provided with tracks or running paths B14, D14. Each retaining web 26 is secured over its entire length by a tongue or key 26a which engages in a corresponding groove 26b in the bearing body 10.

As can be seen from FIG. 2 and 4, the bearing body 10 has two through-boreholes 28 running in the web 20 transversely to the longitudinal direction of the rail 12 and parallel to the connecting planes VE1, VE2 of the ball cycles A, B and C, D respectively. Each through-borehole 28 has a supporting counterbore or offset or shoulder 28a on one side of the plane of symmetry S-S, whereas on the other side of the plane of symmetry S-S it has a threaded region or section 28b. Between the supporting offset 28a and the threaded section 28b there is a non-threaded section V whose width is larger than the width of the rail 12. Preferably the width of the section V corresponds to the distance between the load-transmitting ball rows A1, C1 on the one side and B1, D1 on the other side. A cap screw 30 forming a tension bolt is screwed in each through-borehole 28 as a biassing or preloading means. In case the cap screw 30 is tightened in the borehole 28, the cap screw 30 abuts with its head 30a on the supporting offset 28a as a first point of application and with its threaded region 30b on the threaded section 28b as a second point of application. In that way the section V is elastically upset and the load-transmitting ball rows A1-D1 are preloaded almost uniformly between the tracks relating thereto.

In FIG. 4 a further embodiment of the invention is illustrated. It differs from the embodiment according to FIG. 1 to 3 in that way that the tracks or running paths B13, D13 of the bearing body 10 are formed by running plates 32 which are preferably made of steel. Therefore a material which is softer in relation to steel and can thus be upset more easily can be used for the bearing body 10. The running plates 32 can be disposed for a swing movement in the bearing body 10 on a horizontal axis (34) or a vertical axis (36) which are shown schematically, with reference to the alignment of the bearing body 10.

What is claimed is:

1. An anti-friction bearing for linear movements comprising a bearing body (10) which is guided movable on a rail (12) in a longitudinal direction thereof, the bearing body (10) having legs (18a, b) accommodating at least a part of the rail (12) between them and a web (20) connecting these legs (18a, b) integrally to one another, at least one rolling body cycle (A-D) being allocated to each of the legs (18a, b), each of the rolling body cycles (A-D) having a load-transmitting rolling body row (A1-D1) in engagement with a load-receiving running path (B13, D13) of the respective leg (18a, b) and with a running path (A12, B12, C12, D12) at a side face of the rail (12), said side face being adjacent to said leg (18a, b), the load-transmitting rolling body rows (A1-D1) being preloadable between the respective allocated running paths (B13, D13; A12-D12) and this preload being adjustable by preloading means (30), characterized in that the preloading means (30) are disposed in the range of the web (20) with a direction of effect substantially perpendicular to the longitudinal direction of the rail (12) and substantially parallel to a connecting plane (VE1, VE2) of two load-transmitting rolling body rows (A1-D1) lying at either side of the rail (12), and which are designed to upset the web (20) in the direction of effect.

2. An anti-friction bearing according to claim 1 characterized in that the preloading means (30) at the web (20) act on points of application whose distance (V) in direction of effect preferably corresponds to the distance of the load-transmitting rolling body rows (A1-D1).

3. An anti-friction bearing according to claim 1 characterized in that the preloading means (30) are accommodated within the web (20).

4. An anti-friction bearing according to claim 3 characterized in that the preloading means (30) comprise at least one tension bolt (30) which is accommodated in a borehole (28) within the web (20).

5. An anti-friction bearing according to claim 4 characterized in that a first point of application of the tension bolt (30) is formed by a tension bolt head (30a) supported by a shoulder (28a) of the borehole (28), and a second point of application is formed by a screw-joint (30b) of the tension bolt (30) with a threaded section (28b) of the borehole (28).

6. An anti-friction bearing according to claim 1 characterized in that the preloading means (30) are spread along the longitudinal extension of the bearing body (10) in the longitudinal direction of the rail (12).

7. An anti-friction bearing according to claim 6 characterized in that the preloading means (30) are designed within the longitudinal extension of the load-transmitting rolling body rows (A1-D1) for the imparting of varying preload.

8. An anti-friction bearing according to claim 7 characterized in that in the mid-range of the load-transmitting rolling body rows (A1-D1) a higher preload can be produced than in the end ranges thereof.

9. An anti-friction bearing according to claim 1 characterized in that the rolling body cycles (A-D) are formed by balls.

10. An anti-friction bearing according to claim 9 characterized in that the load-receiving running paths (B13, D13; A12-D12) of the bearing body (10) and/or of the rail (12) are formed by tracks.

11. An anti-friction bearing according to claim 1 characterized in that to each leg (18a, b) are allocated two rolling body cycles (A-D) with a corresponding number of load-transmitting rolling body rows (A1-D1), the connecting planes (VE1, VE2) of two respective pairs of load-transmitting rolling body rows (A1, B1; C1, D1) of both legs being substantially parallel to one another.

12. An anti-friction bearing according to claim 1 characterized in that at least a midrange (V) of the web (20) is made elastically-upsetably-soft by the provision of recesses.

13. An anti-friction bearing according to claim 1, characterized in that the bearing body (10) consists of elastically-upsetable-soft material.

14. An anti-friction bearing according to claim 1 characterized in that the load-receiving running paths (B13, D13) of the bearing body (10) are designed at running plates (32) which consist of a harder material in comparison to the material of the bearing body (10), and which are possibly attached for a swing movement in relation to the respective leg (18a, b).

15. An anti-friction bearing according to claim 1 characterized in that on the side of the web (20) which is remote from the legs (18a, b) a fixing surface is provided for the fixing of a connecting part and that for the fixing of the connecting part fixing means are provided at this fixing surface which allow a play of the fixing which corresponds to the range of upset deformations to be expected of the web (20).

* * * * *

UNITED STATES PATENT AND TRADEMARK OFFICE
CERTIFICATE OF CORRECTION

PATENT NO. : 5,059,037

DATED : October 22, 1991

INVENTOR(S) : Ernst Albert

It is certified that error appears in the above-identified patent and that said Letters Patent is hereby corrected as shown below:

Col. 3, line 17     "at least" should read --at least one--;
Col. 3, line 38     "designed at" should read --designed as--;
Col. 4, line 45     "aswell" should read --as well--;
Col. 6, line 55     "designed at" should read --designed as--.

Signed and Sealed this

Twentieth Day of April, 1993

Attest:

MICHAEL K. KIRK

Attesting Officer

Acting Commissioner of Patents and Trademarks